United States Patent [19]

Blom

[11] 4,164,337

[45] Aug. 14, 1979

[54] SEAT BELT RETRACTOR WITH PIVOTED LOCKING MECHANISM

[75] Inventor: Hubert P. Blom, Royal Oak, Mich.

[73] Assignee: General Motors Corporation, Detroit, Mich.

[21] Appl. No.: 887,050

[22] Filed: Mar. 16, 1978

[51] Int. Cl.² .................. A62B 35/02; B65H 75/48
[52] U.S. Cl. ....................... 242/107.4 A; 297/478
[58] Field of Search ............... 242/107.4 A, 107.4 R, 242/107.4 B–107.4 E; 297/388; 280/744–747

[56] References Cited

U.S. PATENT DOCUMENTS

| | | | |
|---|---|---|---|
| 3,552,676 | 1/1971 | Weber | 242/107.4 A |
| 3,948,460 | 4/1976 | Kondziola | 242/107.4 A |
| 3,960,339 | 6/1976 | Fisher | 242/107.4 R |
| 4,018,399 | 4/1977 | Rex | 242/107.4 A |
| 4,040,576 | 8/1977 | Walker et al. | 242/107.4 A |
| 4,069,988 | 1/1978 | Pouget | 242/107.4 A |

*Primary Examiner*—Harvey C. Hornsby
*Assistant Examiner*—John M. Jillions
*Attorney, Agent, or Firm*—Charles E. Leahy

[57] ABSTRACT

The inertia locking mechanism for a rotatably mounted belt reel includes a support member mounted for rotation about the axis of reel rotation. A lock bar is pivotally mounted on the support member and has locking teeth on one side adapted to engage the reel and locking teeth on the other side adapted to engage a set of arcuately displayed teeth on the retractor housing so that the lock bar blocks rotation of the reel relative the frame. A pendulum is mounted on the support member and is actuated by inertia stimulus to move the lock bar to the locking position. Gravity causes the support member, lock bar, and pendulum to rotate about the axis of reel rotation so that the pendulum attains its normal vertical depending position irrespective of the mounting orientation of the retractor housing about the axis of reel rotation. Balance weights are added to the support member to control the magnitude and location of the unbalanced mass so that an inertia stimulus does not impart rotation to the support member prior to the actuation of the pendulum by the inertia stimulus to engage the lock bar.

2 Claims, 5 Drawing Figures

SEAT BELT RETRACTOR WITH PIVOTED LOCKING MECHANISM

The invention relates to a seat belt retractor and more particularly to a seat belt retractor having an inertia locking mechanism which is self-adjusting to accommodate variation in the mounting orientation of the retractor about the axis of reel rotation.

BACKGROUND OF THE INVENTION

It is well known that seat belt retractors may be located in various vehicle mounting orientations such as on the roof, on the floor, on the body pillar, or on the seat back. It is known that economy of manufacture can be achieved by provision of a seat belt retractor which can be mounted in various mounting orientations. Furthermore, when the retractor is mounted on the seat back, it is necessary to accommodate adjustment of the angle of the seat back.

Great Britain patent Kell 1,282,577, published July 19, 1972, discloses a retractor wherein the inertia sensing pendulum is mounted for adjustment about the axis of rotation of the reel to accommodate various mounting orientations.

Other prior art retractors such as Stephenson et al U.S. Pat. No. 3,901,461, issued Aug. 26, 1975, disclose the mounting of an inertia sensor on a gimbal or trunnion arrangement so that gravity forces automatically adjust the inertia sensor relative the lock bar.

BRIEF SUMMARY OF THE INVENTION

The present invention relates to a seat belt retractor wherein both the inertia sensor and the lock bar are mounted for rotation about the axis of the reel rotation.

According to the invention, the inertia locking mechanism for a rotatably mounted belt reel includes a support member which is mounted for rotation about the axis of reel rotation. A lock bar is pivotally mounted on the support member and has locking teeth on one side adapted to engage the reel and locking teeth on the other side adapted to engage an arcuate display of teeth on the retractor housing so that the lock bar blocks rotation of the reel relative the frame. A pendulum or other inertia sensor is mounted by the support member and is actuated by inertia stimulus to move the lock bar to the locking position. Gravity causes rotation of the support member together with the lock bar and pendulum so that the pendulum attains its normal vertical depending position irrespective of the mounting orientation of the retractor housing about the axis of reel rotation. Balance weights are added to the support member so that the effect of an inertia stimulus does not impart rotation to the support member prior to the actuation of the pendulum by the inertia stimulus to engage the lock bar.

BRIEF DESCRIPTION OF THE DRAWINGS

These and other objects, features and advantages of the invention will become apparent upon consideration of the specification and the appended drawings in which.

DESCRIPTION OF THE PREFERRED EMBODIMENT

Figure 1:
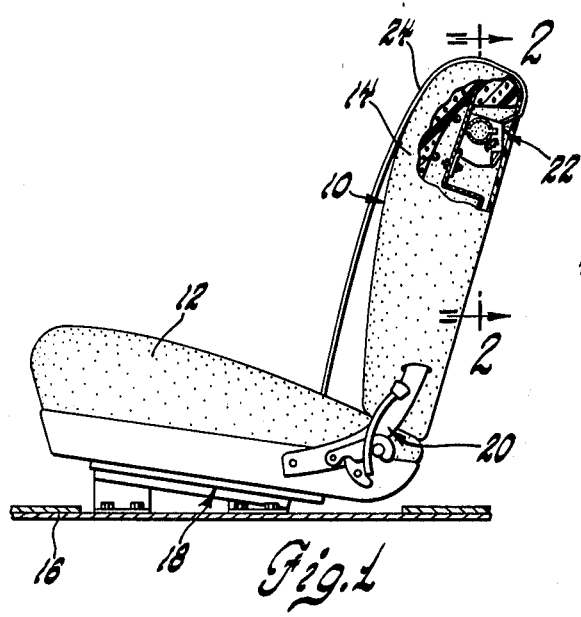
FIG. 1 is a side elevation view of a vehicle seat having parts broken away to show the seat belt retractor according to this invention.

Referring to FIG. 1, there is shown a motor vehicle seat 10 including a seat bottom 12 and a seat back 14. The seat bottom 12 is attached to the vehicle floor 16 by a conventional fore and aft seat adjusting mechanism generally indicated at 18. The seat back 14 is pivotally connected to the seat bottom 12 by a multi-position seat back angle adjuster generally indicated at 20. Such a seat back angle adjuster permits the occupant to adjust the angle of inclination of the seat back relative the seat bottom for optimum occupant comfort. The construction and operation of such a seat back adjuster is disclosed in U.S. Pat. No. 3,792,898, patented Feb. 19, 1974 by Brook A. Lindbert and assigned to the assignee of this invention.

Figure 2:
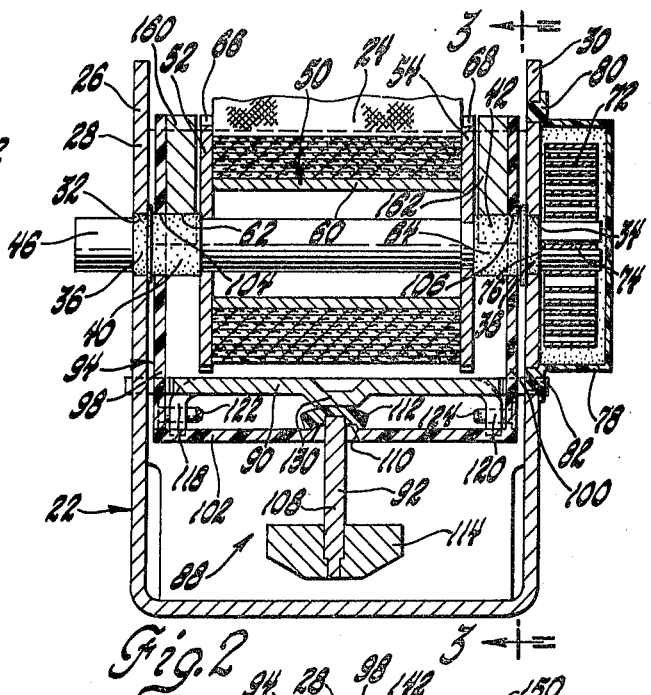
FIG. 2 is a sectional view taken in the direction of arrows 2—2 of FIG. 1.
Figure 3:
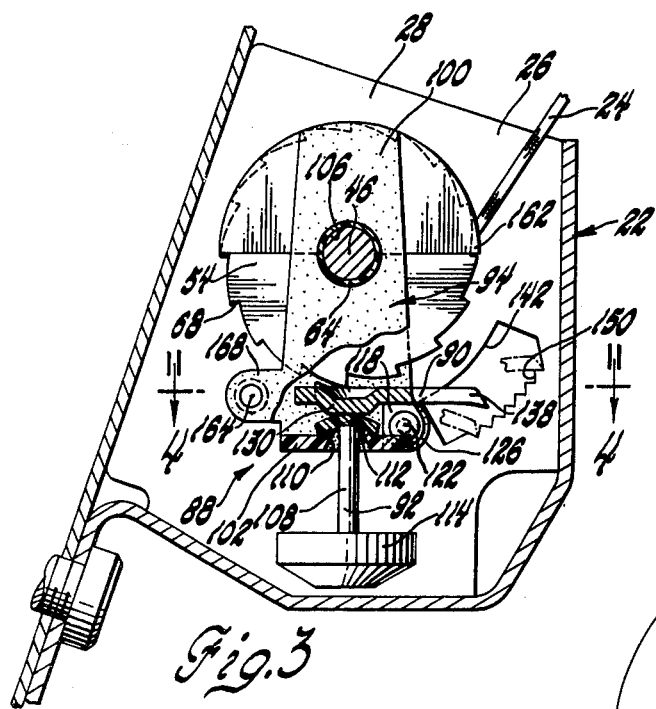
FIG. 3 is a sectional view taken in the direction of arrows 3—3 of FIG. 2.

A shoulder belt retractor generally indicated at 22 is mounted within the seat back 14 for winding and unwinding a shoulder belt 24. Referring to FIGS. 2 and 3, it is seen that the retractor 22 includes a housing 26 having laterally spaced sidewalls 28 and 30. The sidewalls 28 and 30 have respective apertures 32 and 34 which receive bearing portions 36 and 38 of bushings 40 and 42. A reel shaft 46 extends between the sidewalls 28 and 30 and is journalled for rotation by the bearing portions 36 and 38 of the bushings 40 and 42. A reel, generally indicated at 50, includes spaced apart ratchet wheels 52 and 54 which are rotatable on the reel shaft 46 and are spaced apart by a drum 60 to which the shoulder belt 24 is attached. The ratchet wheels 52 and 54 are spaced from the housing sidewalls 28 and 30 by bearing portions 62 and 64 of the bushings 40 and 42. The ratchet wheels 52 and 54 have ratchet teeth 66 and 68 displayed on their outer peripheral surfaces as best seen in FIG. 3.

The shaft 46 and reel 50 are rotated in the clockwise belt winding direction of FIG. 3 by a spiral spring 72 having its inner end 74 anchored in a slot 76 of reel shaft 46 and its outer end, not shown, suitably anchored on a plastic spring housing 78 which is attached to the sidewall 30 by integral projections 80 and 82 thereof which extend into mating apertures of the sidewall 30.

Figure 5:
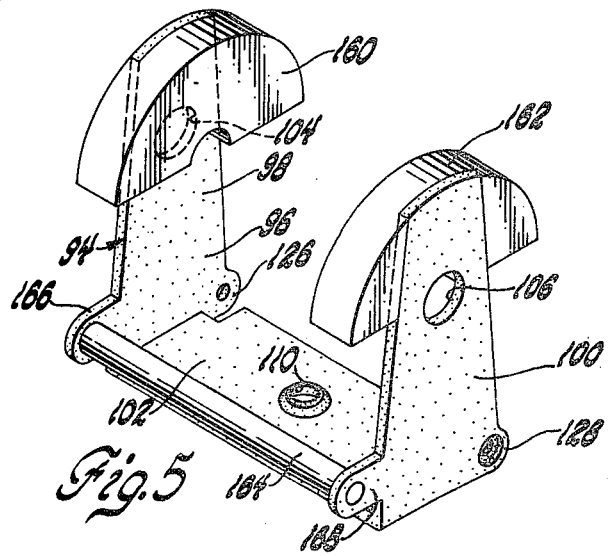
FIG. 5 is a perspective view showing the pendulum support assembly of the seat belt retractor.

A vehicle inertia sensitive locking mechanism generally indicated at 88 is provided for locking the reel 50 against belt unwinding rotation in response to rapid deceleration of the motor vehicle in which the seat 10 is located. The inertia locking mechanism 88 is generally comprised of a lock bar 90 and an inertia sensing pendulum 92, which are mounted within the retractor housing 26 by a support assembly 94. Referring to FIG. 5, it is seen that the support assembly 94 includes a molded plastic support member 96 having spaced apart upstanding legs 98 and 100 which are connected by a pendulum support portion 102. The legs 98 and 100 have apertures 104 and 106 which receive the bearing portions 62 and 64 of bushings 40 and 42 to journal the support assembly 94 for rotation about the reel shaft 46.

As best seen in FIGS. 2 and 3, the pendulum 92 includes a stem 108 having an upper end which projects through an aperture 110 of the pendulum support portion 102 and a cap 112 which mushrooms outwardly to suspend the stem 108 from the support portion 102. A weight 114 is pendulously supported at the end of the stem 108. Accordingly, it will be appreciated that an inertia stimulus will cause the pendulum weight 114 to pivot the stem 108 relative the pendulum support portion 102.

Figure 4:
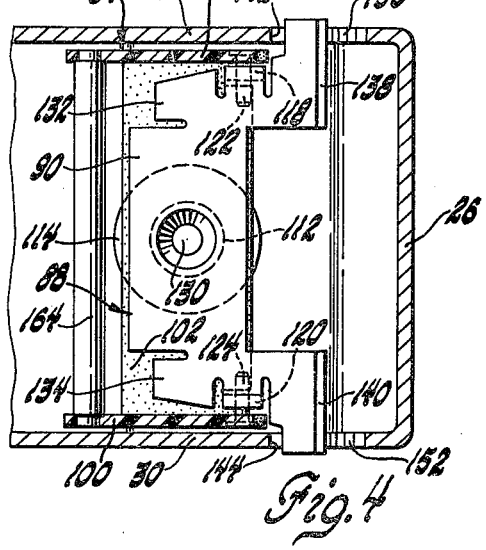
FIG. 4 is a sectional view taken in the direction of arrows 4—4 of FIG. 3.

Referring to FIGS. 2, 3 and 4 it is seen that the lock bar 90 is stamped from sheet metal and has a generally planar configuration including downturned legs 118 and 120 which are juxtaposed with the legs 98 and 100 of support member 96. Pivot pins 122 and 124 extend between apertured tabs 126 and 128 of the legs 98 and 100 and the respectively juxtaposed legs 118 and 120 to mount the lock bar 90 for pivotal movement about an axis which extends parallel to the axis of reel rotation defined by shaft 46. The lock bar 90 has a central depressed portion 130 which bears upon the cap 112 of the pendulum 92 to support the lock bar 90 at its normal rest position of FIG. 3. As best seen in FIGS. 3 and 4, the lock bar 90 has laterally spaced locking teeth 132 and 134 which are adapted for locking engagement with the ratchet teeth 66 and 68 of ratchet wheels 52 and 54. The lock bar 90 also has laterally spaced locking teeth 138 and 140 at its opposite side edge which have a greater lateral extent than the locking teeth 132 and 134 to extend through openings 142 and 144 provided respectively in the housing sidewalls 28 and 30. The walls defining the openings 142 and 144 have a respective display of teeth 150 and 152 thereon which is arcuate about the axis of reel rotation defined by reel shaft 46.

When the vehicle experiences a predetermined level of acceleration or deceleration, the pendulum weight 114 moves relative the pendulum support assembly by virtue of its momentum so that the stem 108 is tilted relative the pendulum support portion 102 and causes the cap 112 to pivot the lock bar 90 in the clockwise direction as viewed in FIG. 3. This pivoting movement of the lock bar 90 causes its locking teeth 132 and 134 to respectively engage the ratchet teeth 66 abd 68 of ratchet wheels 52 and 54 while the oppositely facing locking teeth 138 and 140 are simultaneously pivoted into locking engagement with the teeth 150 and 152 of the housing sidewalls so that the lock bar 90 blocks the reel 50 against rotation relative the housing 26.

Referring to FIGS. 2 and 3, it will be understood that the pendulum 92 is supported in its vertical depending position shown therein in order to provide a predictable response to an inertia stimulus imposed in any of 360° in the horizontal plane. The pendulum member 96 is journalled for rotation on the bearing portions 62 and 64 of the bushings 40 and 42 so that the support member 96 may pivot as necessary to establish the pendulum vertical depending position. Referring to FIG. 5, it is seen that counterbalance weights 160 and 162 are attached to the legs 98 and 100 of pendulum support 94 above the axis of rotation defined by the reel shaft 46. An additional weight in the form of a rod 164 extends between apertured tabs 166 and 168 of the legs 98 and 100.

The weights 160 and 162 and the rod 164 have a mass and a location which is calculated to cooperate with the mass and relative locations of the support member 94, lock bar 90 and pendulum 92 to locate the center of gravity intermediate the axis of rotation and the pendulum so that the force of gravity acting on the resulting unbalanced mass will cause rotation of the support member to establish the pendulum in the precise orientation which provides a predictable response to an inertia stimulus. Furthermore, the magnitude and center of gravity of this unbalanced mass is calculated to assure actuations of the pendulum to engage the lock bar prior to the inertia stimulus acting upon the unbalanced mass to impart rotation to the inertia locking mechanism 88.

It has been found that a properly functioning retractor may be obtained by sizing and placing the weights 160 and 162 and the rod 164 in a manner which places the combined center of gravity of the support member 96, weights 160 and 162, rod 164 and the lock bar 90 coincident with the axis of rotation of these elements about the reel shaft 46. Accordingly, these elements are supported for rotation at their combined center of gravity so that they will remain balanced at an initial position irrespective of the force of gravity or an inertia stimulus imposed from any direction. The mass of pendulum 92 unbalances the support assembly 94 so that the force of gravity acting thereon causes the support member 96 to assume the position of FIG. 3 wherein the pendulum 92 is supported in its desired vertical depending position for predictable response to inertia stimulus from any direction in the horizontal plane.

Referring again to FIG. 1, it will be understood that a change in the angle of inclination of seat back 14 obtained by an adjustment of the seat back angle adjuster 20 will also change the mounting orientation of the retractor housing 26 with respect to the axis of rotation of reel 50. It will be undersood that the inertia lock mechanism generally indicated at 88 will be automatically rotated somewhat about the reel shaft 46 by gravity to reestablish the vertical depending orientation of FIG. 3. Furthermore, it will be understood that the arcuate extent of ratchet teeth 150 and 152 approximates the angle through which the seat back 14 may be pivoted so that irrespective of such rotation of the inertia locking mechanism 88 the locking teeth 138 and 140 of lock bar 90 will be poised in proximity with the locking teeth 150 and 152. Upon occurrence of an inertia stimulus having a magnitude sufficient to tilt the pendulum 92, the lock bar 90 rotates into locking engagement with the ratchet teeth of ratchet wheels 52 and 54 and the locking teeth 150 and 152 of the housing 26.

The bearing portions 36 and 38 of bushings 40 and 42 are preferably press-fit into the apertures 32 and 34 of the sidewalls 28 and 30 so that the bushings do not rotate upon rotation of the reel shaft 46. The sidewall apertures 104 and 106 of the support member 96 are slightly oversized with respect to the bearing portions 62 and 64 of the bushings 40 and 42 to facilitate rotation of the support member 96 about the axis of reel rotation. Thus, the bushings 40 and 42 isolate the support member 96 from the reel shaft 46 so that rotation of the reel shaft upon belt winding or unwinding does not impart torque to the pendulum support.

It will be understood that the pendulum 92 could be replaced by a ball-type inertia sensor resting in a cup-shaped support as taught by the prior art.

Thus, it is seen that the invention provides a new and improved seat belt retractor wherein an inertia sensor support member mounts both the lock bar and the inertia sensor for gravity induced rotation about the axis of rotation to establish the inertia sensor in a precise mounting orientation irrespective of the mounting orientation of the retractor housing relative the axis of reel rotation.

The embodiments of the invention in which an exclusive property or provilege is claimed are defined as follows:

1. A motor vehicle seat belt retractor comprising:

a housing adapted for mounting on a motor vehicle;

a belt reel having a restraint belt attached thereto;

a reel shaft mounting the reel on the housing and defining an axis of reel rotation for winding and unwinding the belt;

a support member encircling the reel shaft to define an axis of support member rotation coincident with the axis of reel rotation;

bearing means interposed between the support member and the reel shaft to isolate the support member from the shaft and the reel and thereby prevent frictional transmission of a rotation inducing torque to the support member during rotation of the reel;

a lock bar pivotally mounted on the support member and having a first locking portion normally spaced from the reel and a second locking portion normally spaced from the housing;

an inertia sensing member mounted on the support member and operable under a predetermined inertia stimulus to move the lock bar to a locked condition wherein the first locking portion engages the reel and the second locking portion engages the housing to block unwinding rotation of the reel relative the housing;

and counterweight means associated with the support member adapted to situate the combined center of gravity of the support member, lock bar and inertia sensing member at a point spaced from the axis of reel rotation and to establish the magnitude of their combined mass unbalanced with respect to the axis of rotation so that gravitational force causes rotation of the support member about the axis of reel rotation to establish the inertia sensing member in a precise operative orientation wherein a predictable sensitivity of inertia stimulus is obtained irrespective of the mounting orientation of the housing relative the axis of reel rotation.

2. A motor vehicle seat belt retractor comprising:

a frame adapted for mounting within a defined range of mounting angles upon a motor vehicle;

a belt reel having a restraint belt attached thereto;

a reel shaft mounting the reel on the frame and defining an axis of reel rotation for winding and unwinding the belt;

a plurality of teeth provided on a circular peripheral surface of the reel arcuate about the axis of rotation;

a plurality of teeth provided on the frame in a path arcuate about the axis of rotation and subtending an arc corresponding substantially to the defined angular range of mounting of the frame upon the vehicle body;

a lock bar having a first locking portion adapted for locking engagement with the reel teeth and a second locking portion adapted for locking engagement with the frame teeth to thereby block rotation of the reel relative the frame;

a support member mounting the lock bar for movement between a normal unlocking position and the position of locking engagement;

means mounting the support member on the reel shaft for rotation about the axis of reel rotation;

counterbalance means associated with the support member and the lock bar so that the combined center of gravity of the lock bar, support member and counterbalance means passes through the axis of rotation to balance the support member against rotation in response to vehicle deceleration;

and inertia responsive means mounted on the support member, said inertia sensing means having a mass sufficient to unbalance the support member and effect rotation of the support member to achieve mounting of the inertia sensing means in a precise mounting orientation irrespective of the mounting orientation of the frame about the axis of rotation, said inertia responsive means being movable relative the support member in response to predetermined vehicle deceleration to move the lock bar from the normal unlocking position into locking engagement with the reel teeth and frame teeth.

* * * * *